Sept. 30, 1930.   C. W. BENICA ET AL   1,777,068
AXLE BOX AND CAR TRUCK CONSTRUCTION
Filed Feb. 6, 1929   3 Sheets-Sheet 1
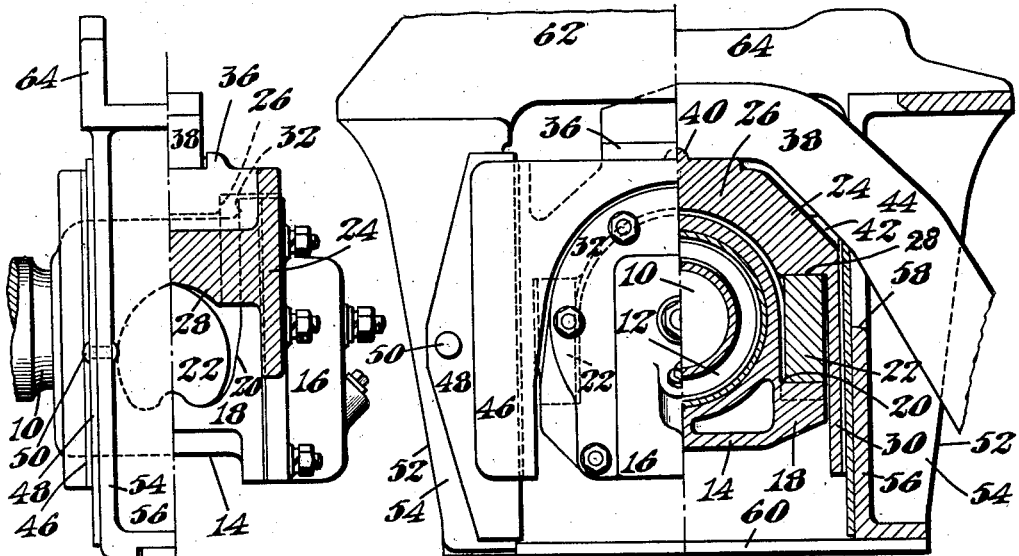
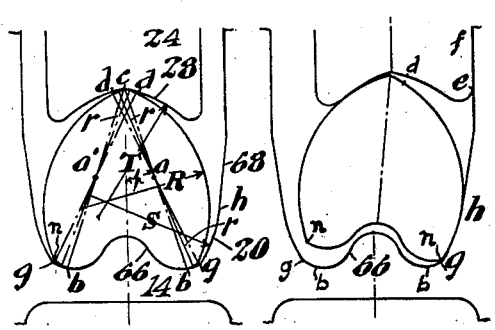
Fig.3.   Fig.4.   Fig.5.   Fig.6.
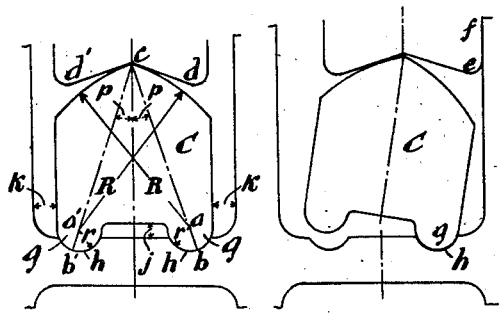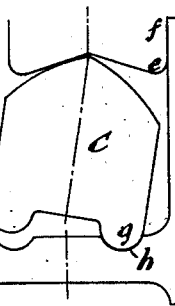
Fig.7.   Fig.8.
INVENTORS:
CHARLES W. BENICA
RICHARD J. BRITTAIN, JR.
BY Gales P. Moore
their ATTORNEY Sept. 30, 1930.  C. W. BENICA ET AL  1,777,068
AXLE BOX AND CAR TRUCK CONSTRUCTION
Filed Feb. 6, 1929   3 Sheets-Sheet 2

INVENTORS:
CHARLES W. BENICA
RICHARD J. BRITTAIN, JR.
BY Gales P. Moore
their ATTORNEY

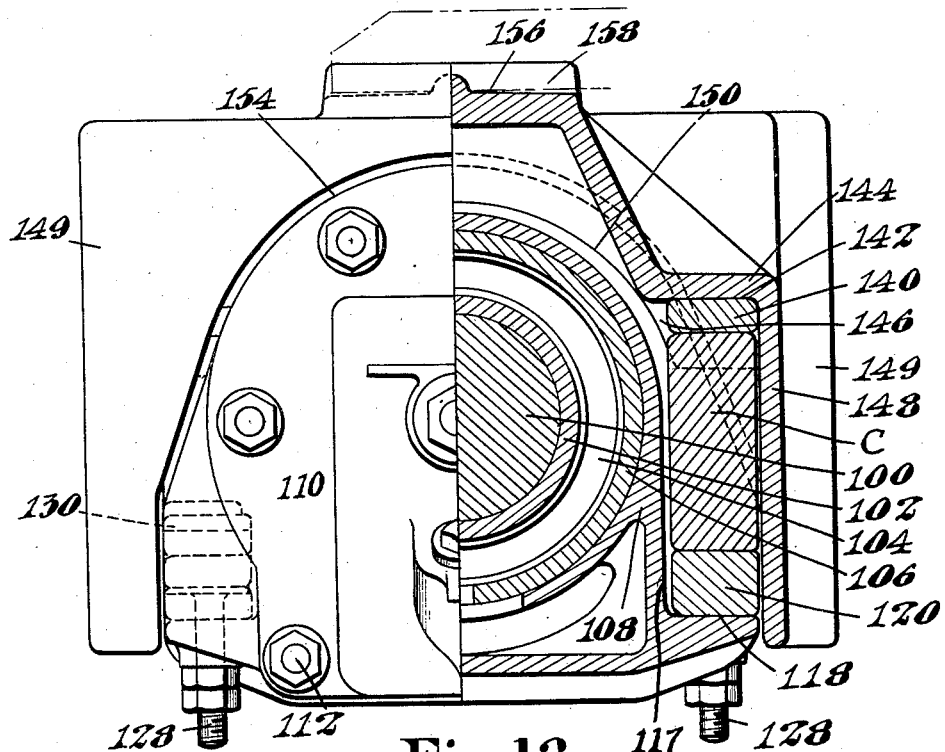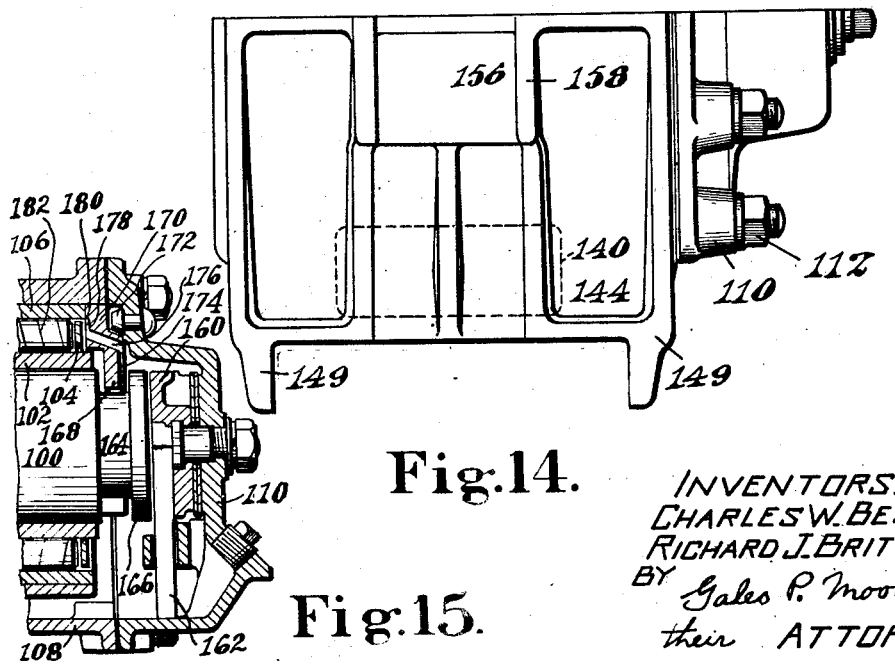

Patented Sept. 30, 1930

1,777,068

UNITED STATES PATENT OFFICE

CHARLES W. BENICA, OF EAST ORANGE, AND RICHARD J. BRITTAIN, JR., OF BLOOMFIELD, NEW JERSEY, ASSIGNORS TO GENERAL MOTORS CORPORATION, OF DETROIT, MICHIGAN, A CORPORATION OF DELAWARE

AXLE-BOX AND CAR-TRUCK CONSTRUCTION

Application filed February 6, 1929. Serial No. 337,870.

This invention relates to axle boxes and car truck constructions and comprises all the features of novelty herein disclosed. An object of the invention is to provide an improved form of rocker connection between an axle box and car truck. Another object is to provide an improved cam connection between an axle box and frame such that relative lateral movement between box and frame parts will cause the frame parts to lift and damp the shock of end thrusts. To these ends and to improve generally and in detail upon devices of this character, the invention further consists in the various matters hereinafter disclosed and claimed.

In its broader aspects, the invention is not necessarily limited to the specific constructions disclosed for mere illustrative purposes in the accompanying drawings in which Fig. 1 is a side view, partly in section.

Fig. 2 is an end view, partly in section.

Figs. 3 to 10 are diagrammatic views indicating several forms of cams.

Fig. 13 is an end view, partly in section, of the embodiment shown in Fig. 12.

Fig. 14 is a partial plan view of the box of Figs. 12 and 13.

Fig. 15 is a vertical sectional view, to smaller scale, of the two way thrust construction.

Figure 9:
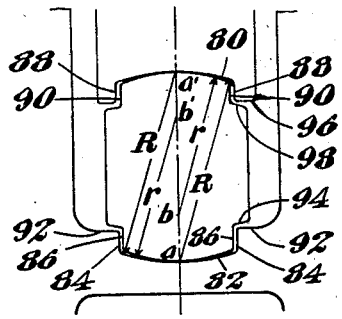

The numeral 10 indicates a shaft or axle journalled by antifriction bearings having a cage 12 in a journal box 14 having an end cap 16, the axle and box having any suitable provision (not shown) for limiting relative endwise movement in both directions. The box has side projections 18 which are recessed as indicated at 20 to receive cams or rocker plates 22 which support a saddle 24 for lateral movement with respect to the box. The saddle has a central portion 26 arched over and clearing the box, cam seats 28 resting on the cams or rocker plates and side walls 30 which embrace the cams and the projections 18. The cams and seats are described in greater detail hereinafter and operate to cause the saddle to lift upon any relative lateral movement between the box and the saddle.

The top of the box has arcuate end flanges 32, one of which is indicated in Fig. 1, embracing the central portion 26 of the saddle to limit relative endwise movement. The top of the saddle has spaced ribs 36 embracing the sides of an equalizer bar 38 which rests on the saddle and is held by a lug 40, one corner of the saddle being recessed as indicated at 42 to admit the inclined portion 44 of the equalizer bar. The saddle is provided at both sides with vertical flanges 46 forming ways to embrace U-shaped wear plates 48 secured by rivets 50 to pedestals 52. Each pedestal upright is U-shaped in cross section, as formed by vertical side flanges 54 and a central web 56. One of the central webs 56 is recessed at 58 to admit the inclined portion 44 of the equalizer bar. The pedestal uprights are connected at the bottom by a bar 60 and are connected at the top by a deep outside flange 62 and a shallower inside flange 64 for attachment to a car frame.

Figs. 3 and 4 illustrate in detail the design of the cam or rocker plate and its cooperating seats to provide a constant ratio between the lift and the lateral movement of the saddle.

The cam is symmetrical about its vertical center line and so are its upper and lower seats. The lower seat is in the form of a reverse curve 66 extending to a point $b$ on each side of the center. Outside the point $b$, the seat is straight to $g$. Outside $g$, the seat has a radius of curvature S merging with a straight surface 68 at $h$. The seat 28 of the saddle has a straight portion extending from $c$ to $d$ on each side of the center line. Outside of $d$ the seat has an arcuate surface with radius of curvature T. When in central position, the cam fits the lower seat out to the points $b$. Beyond $b$, the cam has an arcuate rolling surface extending to $n$, the radius of curvature $r$ having its center at $a$ on line $bc$ which makes an angle $p$ with the center line. From $c$ to $d$ the cam has an arcuate rolling surface also with a radius $r$ centered at $a'$ (opposite $a$). From $d$ to $n$, the cam has an arcuate surface with radius R whose center is in the line $dg$ which passes through $a'$. The center of the radius S is in the line $cb$ which passes through $a'$ and is perpendicular to the straight surfaces $cd$ and $bg$. The radii R, S and T are equal in the form shown and the cam operates with true rolling motion to provide a constant ratio between the amount of lift of the saddle and the amount of lateral motion. The angle $p$ is predetermined to suit the required amounts of lift and lateral motion. When the cam rolls to one of its extreme positions, it contacts with the seat along the surface $gh$ and the saddle contacts with a wall of the box along line $ef$.

In Figs. 5 and 6, the ratio of lift to lateral motion constantly increases. The saddle has an arcuate seat 70 and the box has an arcuate seat 72, each with a radius R equal to the height of the cam and struck from centers $a$ and $a'$ in the vertical center line. The cam C has upper and lower surfaces each with a radius $r$, smaller than radius R, and struck from centers $b$ and $b'$ in the vertical center line. The radius $r$ is of such length that, when the cam rolls to any position between the extremes, the centers $b$ and $b'$ fall on lines $ac$ and $a'c'$, respectively, which are always normal to the upper and lower seats at their points of contact with the cam. This produces a true rolling motion. The side walls $c'd$ of the lower seat slant outwardly to provide surface contact with the straight sides of the cam when the saddle contacts with the vertical walls at $ef$. To retain the cam and saddle in proper rolling engagement, the rear of the cam has an involute tooth D entering a recess E of the saddle.

In Figs. 7 and 8, the ratio of lift to lateral motion is constant. The saddle has inclined straight surfaces $cd$ and $cd'$ perpendicular to the lines $cb$ and $cb'$ which make an angle $p$ with the vertical center line. The radii R of the cam C and the radii $r$ of the cam and of the lower seat are struck from the centers $a$ and $a'$ which lie in the lines $cb$ and $cb'$ respectively. The cam thus has two arcuate lobes $g$ having contact with corresponding recesses $h$ of the lower seat and with clearance at $j$ and $k$. When the saddle shifts laterally, it rolls on the cam which tilts laterally while one of the lobes $g$ slides in its recess $h$. The sliding acts to dampen the lateral motion. The saddle contacts with the vertical wall $ef$ in extreme position.

Figure 10:
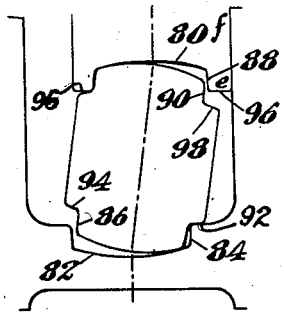

In Figs. 9 and 10, the ratio of vertical lift to lateral motion constantly increases to a certain point and then increases more rapidly. The saddle has an arcuate seat 80 and the box has an arcuate seat 82, each with a radius R equal to the height of the cam, and struck from centers $a$ and $a'$ in the vertical center line. The cam has upper and lower surfaces each with a radius $r$, smaller than R, and struck from centers $b$ and $b'$ in the vertical center line. The lower seat has diverging side walls 84 embracing short parallel side walls 86 of the cam and the upper seat has diverging side walls 88 embracing short parallel side walls 90 of the cam. The lower seat has raised horizontal surfaces or steps 92 at the sides to engage slightly inclined and preferably crowned surfaces 94 of the cam before the cam reaches extreme positions. The upper seat also has horizontal surfaces 96 to engage slightly inclined and preferably crowned surfaces 98 on the cam. After the side walls 86 of the cam engage the side walls 84 of the seat, the rolling contact of the cam is transferred to the raised surfaces 92 and 96 and the lifting action occurs at an accelerated degree (damping the lateral motion) until limited by the saddle contacting with the side wall at $ef$.

Figure 11:
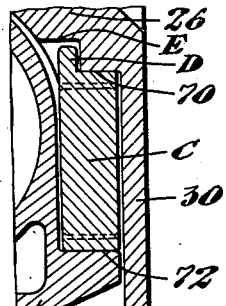
Fig. 11 is a sectional view of one of the cams applied to an axle box.

In all the above described embodiments, the design is such as to give the same ultimate lift of the saddle and the same total lateral movement. The cams may be made of the same thickness and height so that all will fit into the space between the seat on the saddle and the seat on the box. Fig. 11 indicates the toothed cam of Figs. 5 and 6 applied to a box and saddle structure similar to Fig. 1, the tooth D being thinner than the cam and arranged at the inner side of the cam, and the toothed recess E being cut in the saddle at the part adjacent to the box, leaving the arcuate seat 70 continuous for the greater part of the thickness of the cam.

Figure 12:
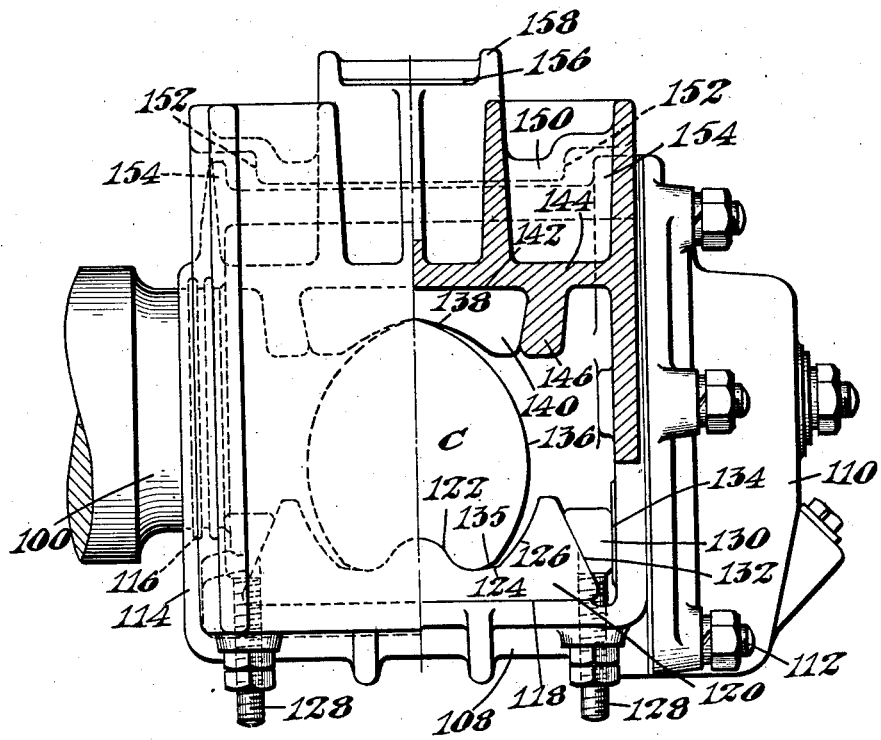
Fig. 12 is a side view, partly in section, of another embodiment.

Figs. 12, 13 and 14 illustrate a rocker motion construction having removable cam seats on the box and saddle. Numeral 100 indicates an axle having a sleeve 102 journalled on antifriction bearings having a cage 104, the bearings running on a lining 106 in a journal box 108. The box has a suitable front end cap 110 secured by nuts 112 and has a rear end wall 114 with grease grooves 116 to surround the shaft. The sides of the box have flat guide faces 117.

Flat horizontal ledges 118 project from the sides of the box to support removable seat plates 120, each having a central reverse curve 122, short straight surfaces 124 and arcuate side walls 126, the contour corresponding to that of the seat of Figs. 3 and 4 and being symmetrical about a vertical center line. Each seat plate is clamped by bolts 128 having wedge shaped heads 130 engaging a slanting face 132 on the seat plate and a flat face 134 on the box. The shank of each bolt traverses a slot at the end of the seat plate and the two bolts provide means for centering the seat plate, as by loosening one bolt and tightening the other, thereby sliding the seat plate horizontally on the ledge 118. Each cam or rocker C has a reversely curved surface fitting the curve 122, short arcuate surfaces 135 and arcuate walls 136, the latter having their upper ends seated on a surface 138 of an upper seat plate 140. The seat plate 140 rests against a surface 142 of a saddle 144 and is confined by inclined lugs 146 of the saddle which engage the inclined ends of the plate.

The saddle has side walls 148 enclosing and guiding the cams, and spaced vertical flanges 149 to embrace pedestals. The saddle has an arcuate interior wall 150 clearing the top of the box, and side walls 152 spaced from arcuate flanges 154 at the ends of the box, thus allowing the saddle to shift laterally a definite distance as it rises or falls. The saddle has a slightly crowned seat 156 at the top with cross ribs 158 to embrace an equalizer bar in the usual way. There are suitable devices in the axle box to take the end thrust of the axle in both directions so that the lateral shifting of the box or saddle will cause the cams to roll to either side of its center position.

Thrust of the axle in one direction is transmitted to the box through a bronze thrust block 160 bolted to the end cap 110 and lubricated by a wick 162. The end of the axle has a groove 164 and a collar 166 which normally has a small clearance with the thrust block and with a thrust flange 168 on a thrust plate 170 held between the end cap and the box lining 106. The thrust plate is U-shaped to embrace the axle and is held from rotation by rivet heads 172 carried by the end cap and entering slots in the plate. The thrust surface next to the axle collar has radial lubricant grooves 174 connected by ducts 176 with short radial grooves 178 which communicate with an arcuate groove 180 adjacent to the lining 106 and its antifriction bearings 182 therein. The two way thrust provision between axle and box will thus cause the lifting cams to operate in both directions.

We claim:

1. In a device of the character described, a journal box, a shaft journalled in the box, a saddle arched over the top of the box, the saddle having lateral clearance with parts of the box to provide limited lateral movement between the box and saddle, the box and shaft having a two-way thrust connection whereby lateral movement of one is communicated to the other in either direction, the lower part of the box having side projections provided with cam seats, the saddle having opposed seats, and cams between the seats and contoured to lift the saddle when lateral movement occurs in either direction between the saddle and the box; substantially as described.

2. In a device of the character described, a journal box, a shaft journalled in the box, a saddle arched over the top of the box, the saddle having lateral clearance with parts of the box to provide limited lateral movement between the box and saddle, the box and shaft having a two-way thrust connection whereby lateral movement of one is communicated to the other in either direction, the lower part of the box having side projections with cam seats, the saddle having opposed seats, cams between the seats and contoured to lift the saddle when lateral movement occurs in either direction between the saddle and the box, an equalizer bar seated on the saddle, and pedestals for vertically guiding the saddles; substantially as described.

3. In a device of the character described, a journal box, a shaft journalled in the box, a saddle extending over the top of the box, the box and saddle having provision for relative lateral movement with means for limiting such movement, the box and shaft having a two-way thrust connection whereby lateral movement of one is communicated to the other in either direction, the sides of the box having projections with cam seats and the saddle having opposed cam seats, and cams between the seats and having arcuate surfaces at both sides of the center for rolling on the seats to lift the saddle when there is lateral movement in either direction between the saddle and the box; substantially as described.

4. In a device of the character described, a journal box, a shaft journalled in the box, a saddle extending over the top of the box, the box and saddle having provision for relative lateral movement with means for limiting such movement, the box and shaft having a two-way thrust connection whereby lateral movement of one is communicated to the other in either direction, the sides of the box having projections with cam seats and the saddle having opposed cam seats, cams between the seats and having arcuate surfaces at both sides of the center for rolling on the seats to lift the saddle when there is lateral movement in either direction between the saddle and the box, an equalizer bar seated on the saddle, and frame members for vertically guiding the saddle; substantially as described.

5. In a device of the character described, a journal box, a shaft journalled in the box, a saddle extending over the top of the box, the box and saddle having provision for relative lateral movement with means for limiting such movement, the box and shaft having a two-way thrust connection whereby lateral movement of one is communicated to the other in either direction, a seat plate detachably fastened to the box, and a rolling lifting cam interposed between the seat plate and the saddle for lifting the saddle when lateral movement occurs in either direction between the saddle and the box; substantially as described.

6. In a device of the character described, a journal box, a shaft journalled in the box, a saddle extending over the top of the box, the box and saddle having provision for relative lateral movement with means for limiting such movement, the box and shaft having a two-way thrust connection whereby lateral movement of one is communicated to the other in either direction, a seat plate detachably secured to the saddle, and a rolling lifting cam interposed between the seat plate and the box for lifting the saddle when lateral movement occurs in either direction between the saddle and the box; substantially as described.

7. In a device of the character described, a journal box, a shaft journalled in the box, a saddle extending over the top of the box, the box and saddle having provision for relative lateral movement with means for limiting such movement, the box and shaft having a two-way thrust connection whereby lateral movement of one is communicated to the other in either direction, a seat plate detachably mounted on the saddle, a seat plate detachably mounted on the box, and a rolling lifting cam interposed between the seat plates for lifting the saddle when lateral movement occurs in either direction between the saddle and the box; substantially as described.

8. In a device of the character described, a journal box, a shaft journalled in the box, a saddle extending over the top of the box, the box and saddle having provision for relative lateral movement with means for limiting such movement, the box and shaft having a two-way thrust connection whereby lateral movement of one is communicated to the other in either direction, lifting cams interposed between the saddle and the box and operable to lift the saddle when the saddle and box have relative lateral movement in either direction, and an equalizer bar seated on the saddle; substantially as described.

9. In a device of the character described, a journal box, a shaft journalled in the box, a saddle extending over the top of the box, a seat plate mounted on the box and having a cam seat, a cam interposed between the seat plate and the saddle, and means for laterally moving the seat plate to center the cam seat; substantially as described.

10. In a device of the character described, a journal box, a shaft journalled in the box, a saddle extending over the top of the box, a seat plate mounted on the box, a cam interposed between the seat plate and the saddle, and clamping means having wedges engaging the seat plate to secure the seat plate in adjusted position on the box; substantially as described.

11. In a device of the character described, a journal box, a shaft journalled in the box, a saddle extending over the top of the box, a seat plate mounted on the box and having inclined slotted ends, a lifting cam interposed between the seat plate and the saddle, clamping bolts traversing the slots and having wedge shaped heads engaging the inclined ends of the seat plate; substantially as described.

In testimony whereof we hereunto affix our signatures.
RICHARD J. BRITTAIN, Jr.
CHARLES W. BENICA.